United States Patent [19]

Rosselli

[11] Patent Number: 4,718,193
[45] Date of Patent: Jan. 12, 1988

[54] TRAPS FOR FLYING INSECTS

[76] Inventor: Bartholomew A. Rosselli, 72-15 67th Pl., Glendale, N.Y. 11385

[21] Appl. No.: 829,957
[22] Filed: Feb. 18, 1986
[51] Int. Cl.$^4$ ............................................. A01M 1/10
[52] U.S. Cl. ..................................................... 43/122
[58] Field of Search .................. 43/122, 133, 107, 118

[56] References Cited

U.S. PATENT DOCUMENTS 2,715,295  8/1955  Brown ................................ 43/107

FOREIGN PATENT DOCUMENTS 85185  3/1955  Norway ............................. 43/122

Primary Examiner—Nicholas P. Godici
Assistant Examiner—Gerard Reid
Attorney, Agent, or Firm—Charles E. Baxley

[57] ABSTRACT

A trap for flying insects, such as flies, comprises a watertight can having a bottom and an imperforate wall upstanding from the bottom, a cap having an opening therethrough and removably interengageable with the wall of the can, and a cylinder having a bottom end and a top end, the bottom end of the cylinder being in open communication with the cap opening, and the wall of the cylinder having a plurality of holes therethrough. Insects can enter the can by passing through the holes and then out the bottom end of the cylinder and through the opening, whereby with water and bait in the can, insects will be lured into the can to their death by drowning. A preferred bait is fish gut.

9 Claims, 1 Drawing Figure

U.S. Patent
Jan. 12, 1988
4,718,193
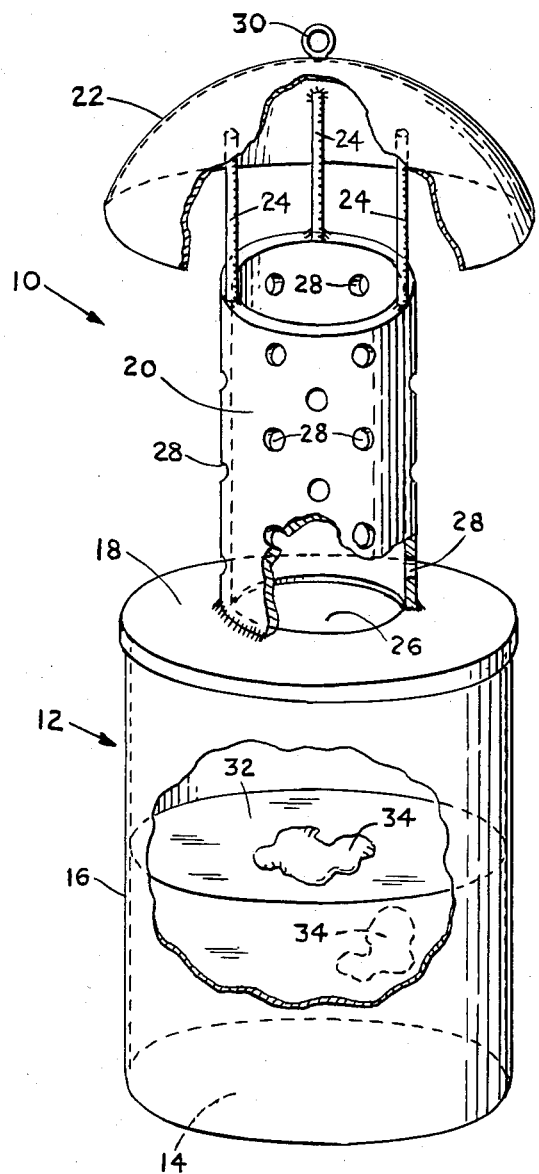

TRAPS FOR FLYING INSECTS

BACKGROUND OF THE INVENTION

This invention relates to traps for flying insects, most especially flies. More particularly, the invention relates to a trap which contains water and bait for luring flies into the trap and into the water where they drown.

An important object of the invention is to provide an improved trap for flying insects, which trap is simple in construction and effective in operation.

Another object is to provide such a trap which can easily and cheaply be prepared for use and re-use.

Pelton U.S. Pat. No. 848,125, issued Mar. 26, 1907, discloses a device containing a quantity of liquid, such as warm water and soap suds or lye, for entrapping insects. The device requires action by the user, being hung on pivots which are carried by a fork which may be held in the user's hand or may be attached to a rod which may be held in the user's hand for use in high places. In either event, the user must carry the device as he searches for insects.

The inventive trap has the advantage that it is passive, as far as the user is concerned, after he has prepared the trap for operation.

Accordingly, a further object of the invention is to provide a trap which requires no action by the user after he has prepared the trap for operation.

Further objects and advantages will appear hereinafter.

SUMMARY OF THE INVENTION

The inventive trap for flying insects, such as flies, comprises a watertight can having a bottom and an imperforate wall upstanding from the bottom, a cap having an opening therethrough and removably interengageable with the wall of the can, and a cylinder having a bottom end and a top end, the bottom end of the cylinder being in open communication with the cap opening, and the wall of the cylinder having a plurality of holes therethrough. Insects can enter the can by passing through the holes and then out the bottom end of the cylinder and through the opening, whereby with water and bait in the can insects will be lured into the can to their death by drowning. A preferred bait is fish gut.

DESCRIPTION OF THE DRAWING

The single FIGURE is a perspective view, partly broken away, of a trap which is a preferred embodiment of the invention.

DESCRIPTION OF THE INVENTION

The FIGURE shows a trap, indicated generally at 10, for flying insects, embodying the invention. In the ensuing discussion it will be assumed without limitation that the insects are flies.

Trap 10 comprises a watertight can 12 of suitable material, such as metal, plastic or glass, having a closed circular bottom 14, and an imperforate cylindrical wall 16 upstanding from the periphery of bottom 14. The end of wall 16 remote from bottom 14 is provided with an external screw thread (not shown).

Trap 10 further comprises an upper assembly which includes a cap 18, a cylinder 20, a top member 22 and a plurality of spacers 24.

Cap 18 has an internal screw thread (not shown) for screw threaded engagement with the external thread on the end of wall 16 remote from bottom 14. Cap 18 also has a central circular opening 26 therethrough.

Cylinder 20 is open at its top and bottom ends and has a plurality of holes 28 through its wall. Holes 28 are large enough that flies or other insects can pass therethrough. The bottom end of cylinder 20 is secured in suitable manner, as by welding, in opening 26 in cap 18.

Top member 22 is in the form of an inverted bowl which is held spaced from the top end of cylinder 20 by spacers 24 which are suitably secured, as by welding, at their lower ends to cylinder 20 and at their upper ends to top member 22. Spacers 24, of which there may be three or four, for example, are evenly spaced circumferentially and are parallel to each other and individually and collectively do not occupy much circumferential space.

Top member 22 has, on its axis, an external eye or hook 30 providing means for hanging trap 10.

Cylinder 20 and top member 22 are coaxial, and these parts are also coaxial with can 12 when trap 10 is assembled with the screw threads of can 12 and cap 18 in screw threaded engagement with each other as aforesaid.

Flies entering trap 10 find their way into can 12 by passing between adjacent ones of spacers 24 and thence into the top end of cylinder 20 and thence along the axial length of cylinder 20 and out the bottom end thereof through opening 26 through cap 18 and into can 12. Flies also enter trap 10 by passing through holes 28 into cylinder 20 and thence out the bottom end thereof through opening 26 through cap 18 and into can 12.

Can 12 is filled with water 32 to a predetermined level. Water 32 contains pieces of bait 34, of which fish gut is a preferred example.

It has been found that trap 10 containing water 32 and pieces of fish gut as bait 34 does a highly efficient job of catching flies and luring them to their death by drowning.

It is apparent that the invention achieves the stated objects and advantages and others.

The disclosed details are exemplary only and are not to be taken as limitations on the invention except as those details may be included in the appended claims.

What is claimed is:

1. A trap for flying insects, said trap comprising a watertight can having a closed bottom and an imperforate wall upstanding from said bottom, a cap having an opening therethrough and removably interengageable with the wall of said can at a location remote from said bottom, and a cylinder having a bottom end and a top end, said bottom end of said cylinder being in open communication with said cap opening, and the wall of said cylinder having a plurality of holes therethrough and spaced from each other both around the circumference and along substantially the entire length of said cylinder, said cylinder being large enough that said insects can enter said cap by passing through said holes into said cylinder and then out to bottom end of said cylinder through said opening, whereby with water and bait in said can, insects will be lured into said can to their death by drowning, and wherein said cylinder is open at both ends so that insects can also enter said can by entering the top end of said cylinder.

2. A trap according to claim 1 further comprising a top member covering but spaced from the top end of said cylinder and a plurality of spacers attached to said cylinder and said top member to hold the top member in spaced relationship with respect to said cylinder.

3. A trap according to claim 2 wherein said top member is in the form of an inverted bowl having means for hanging said trap.

4. A trap according to claim 3 wherein said cap, said cylinder, said top member and said spacers provide an upper assembly.

5. A trap according to claim 4 wherein the wall of said can is provided with an external screw thread remote from the bottom of said can, and said cap is provided with an internal screw thread for screw threaded engagement with said internal thread.

6. A trap according to claim 1 wherein said can contains water and bait.

7. A trap according to claim 6 wherein said bait is fish gut.

8. A trap according to claim 3 wherein said can contains water and bait.

9. A trap according to claim 8 wherein said bait is fish gut.

* * * * *